Nov. 8, 1932.　　　　S. N. BUCHANAN　　　　1,887,193
GROUNDING FITTING
Filed Nov. 22, 1930
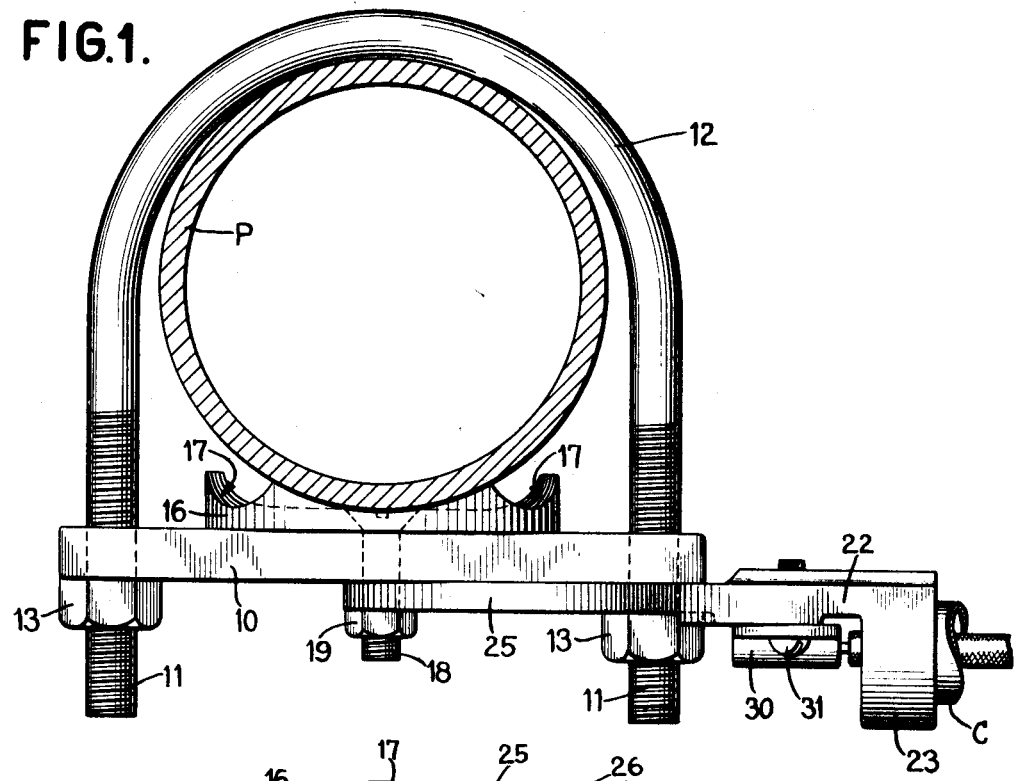
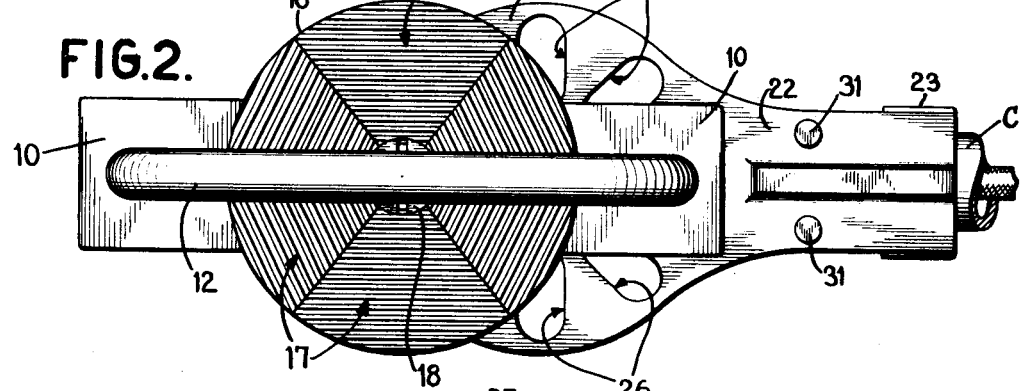
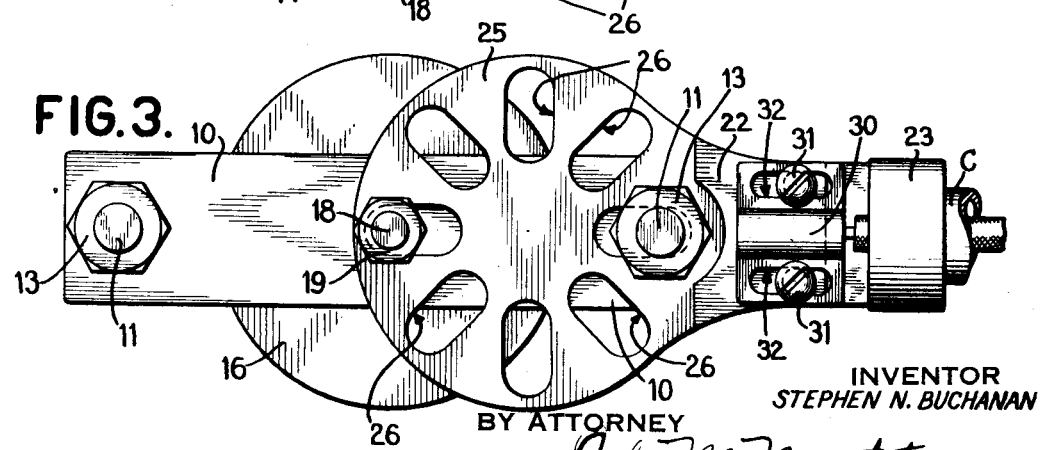
INVENTOR
STEPHEN N. BUCHANAN
BY ATTORNEY
John M. Montstream Patented Nov. 8, 1932

1,887,193

UNITED STATES PATENT OFFICE

STEPHEN N. BUCHANAN, OF ELIZABETH, NEW JERSEY, ASSIGNOR TO THE THOMAS & BETTS CO., OF ELIZABETH, NEW JERSEY, A CORPORATION OF NEW JERSEY

GROUNDING FITTING

Application filed November 22, 1930. Serial No. 497,421.

This invention relates to a grounding fitting by means of which the protective covering for an electrical wiring system, such as a line of conduit or armored cable, is electrically grounded to a conductor such as a water pipe. The grounding fitting is therefore provided with a clamp by means of which the fitting is secured to preferably a grounded water pipe and with a device for anchoring a conduit or armored cable to the fitting. The clamp and anchorage device are fastened together to form a good grounding circuit from the protective covering through the fitting to the grounded conductor.

An object of the invention is to construct a grounding fitting in which the anchorage means for the protective covering of the wiring system is attached to the grounded conductor clamping means through a bolting means positioned centrally of the clamping means. Such construction permits some of the usual grounding fitting parts adapted to be utilized for small diameter grounded conductors to be used with a fitting for clamping to large diameter conductors or pipes.

Another object of the invention is to devise a grounding fitting having a pipe seat member which is adjustable rotatably at the center of the clamp upon a central bolt which bolt also serves as part of the bolting means whereby the anchorage device for a protective covering is secured to the clamp.

Other objects of the invention will be more apparent from the following description taken in connection with the accompanying drawing, in which:

Figure 1 shows the grounding fitting with a pipe clamped thereto and a conduit for a wiring system anchored to the fitting.

Figure 2 is a view looking down upon the grounding fitting from the side carrying the clamp by means of which the grounded conductor is clamped to the fitting.

Figure 3 shows the grounding fitting as seen from the side opposite the view of the fitting in Figure 2 showing the manner in which the anchorage devices for the protective covering is secured to the conductor clamp.

A grounding fitting by means of which the protective covering such as a conduit line for an electrical system is grounded, is ordinarily connected to a water pipe of relatively small diameter. Occasionally the only water pipe available is a large diameter pipe and the invention is principally directed to a grounding fitting for grounding the protective covering for the wiring system to such large diameter pipe. The construction of a grounding fitting for large diameter pipe can be simplified materially and its cost of manufacturing reduced if as many parts as possible are utilized of grounding fittings adapted to connect conduit or armored cable systems to small diameter grounded conductors. The construction disclosed herein utilizes some of the parts of such fitting and is particularly adapted to be clamped or connected to a pipe of large diameter.

The grounding fitting shown in Figure 1 consists of a supporting member 10 having holes provided adjacent the ends thereof through which the threaded legs 11 of a U-shaped yoke 12 pass for clamping a grounded conductor, such as the water pipe P, to the fitting. The nuts 13 are threaded upon the legs 11 of the yoke 12 for securely clamping the water pipe P between the yoke 12 and the supporting member 10. Other forms of clamping means other than the yoke 12 may be utilized within the scope of the invention and the designation clamping means is intended to include any construction by which a grounded conductor is clamped to the supporting member 10.

Although the clamping means for securing a grounded conductor to the supporting member 10 may consist only of the yoke 12 with the nuts 13, the fitting preferably provides a seat member 16 having a plurality of arcuate seats 17 provided therein to accommodate for different diameters of large size pipe. The seat member 16 is secured to the supporting member 10 by bolting means such as the screw or bolt 18 which passes through the center of the seat member 16 and through the center of the supporting member 10. Tightening of the nut 19 on the bolt 18 secures the desired arcuate seat 17 in position upon the supporting member 10.

The anchorage means for attaching the protective covering of an electrical wiring system, such as a conduit C, to the grounding fitting includes an anchorage member 22 provided with a sleeve 23 which may be internally threaded to receive the threaded end of the conduit. The threaded sleeve 23 is merely illustrative of any type of securing means by which a protective covering may be anchored or fixed to the anchorage member 22 and establish good electrical contact therewith. The anchorage member 22 carries an extension 25 through which a plurality of pairs of radially spaced openings 26 extend. One leg 11 of the yoke 12 passes through one of a pair of spaced radial openings and the bolting means or bolt 18 passes through the other radially spaced opening 26 of the pair so that the extension or the anchorage means which includes the anchorage member 22 is securely bolted to the supporting member 10.

It is clear that any pair of the plurality of pairs of radially spaced openings 26 may be utilized to secure the anchorage means to the supporting member 10, depending upon the angular adjustment desired between the clamping means and the anchorage means. If such angular adjustability is not desired, the anchorage member 22 or the extension 25 may have only one such pair of radially spaced openings and therefore the anchorage means may if desired have at least one pair of such openings or a plurality, depending upon whether or not adjustability is desired and what extent of adjustability. The bolt 18 comprises bolting means for securing the anchorage means to the clamping means because it may take any form and need not be a bolt or screw which passes through the supporting member 10 and need not have the double function of securing the anchorage means to the supporting member and fixing the seat member in desired position.

The anchorage member 22 may carry a ground wire securing means 30 which is fixed to the anchorage member 22 by the screws 31. A wire to be grounded passes through the conduit C and is soldered into the grounding wire securing means 30 which illustrates one form of construction which may be used to secure a grounding wire to the grounding fitting. The grounding wire securing means 30 may carry slots 32 through which the screws 31 project in order to adjustably fasten this device to the anchorage member 22.

What is claimed is:

1. A grounding fitting comprising a supporting member, clamping means to secure a large diameter grounded conductor thereto, a seat member, bolting means at the center of the supporting member and passing through the seat member to fix the latter thereto, an anchorage member having means to secure a protective covering for a wiring system thereto, at least one pair of radially spaced holes in the anchorage member, and means including the bolting means at the center of the support extending through a pair of radially spaced holes to secure the anchorage member and seat member to the supporting member.

2. A grounding fitting comprising a supporting member, a yoke having threaded legs extending through the supporting member to clamp a grounded conductor thereto, a nut upon each leg of the yoke, bolting means carried by the supporting member and positioned between the legs of the yoke, an anchorage member having means to secure a protective covering for a wiring system thereto, and at least one pair of radially spaced holes in the anchorage member through which the bolting means and a leg of the yoke passes to secure the anchorage member to the supporting member.

3. A grounding fitting comprising a supporting member, a yoke having threaded legs extending through the supporting member to clamp a grounded conductor thereto, a nut upon each leg of the yoke, bolting means carried by the supporting member and positioned between the legs of the yoke, an anchorage member having means to secure a protective covering for a wiring system to the member, and a plurality of pairs of radially spaced holes in the anchorage member through one pair of which the bolting means and a leg of the yoke passes to secure the anchorage member to the supporting member in one of a plurality of angular positions.

4. A grounding fitting comprising a supporting member, a yoke having threaded legs extending through the supporting member to clamp a grounded conductor thereto, a nut upon each leg of the yoke, a seat member having a plurality of pipe seats and adjustably carried by the supporting member, a bolt at the center of the supporting member and upon which the seat member is rotatably adjustable, an anchorage member having means to secure a protective covering for a wiring system to the member, and at least one pair of spaced holes in the anchorage member through which the bolt and a leg of the yoke passes to secure the anchorage member and the seat member to the supporting member.

5. A grounding fitting comprising a supporting member, a yoke having threaded legs extending through the supporting member to clamp a grounded conductor thereto, a nut upon each leg of the yoke, a seat member having a plurality of pipe seats and adjustably carried by the supporting member, a bolt at the center of the supporting member and upon which the seat member is rotatably adjustable, an anchorage member having means to secure a protective covering for a wiring system to the member, and a plurality of pairs of radially spaced holes in the anchorage member through one pair of which the bolt and a leg of the yoke passes to secure the anchorage member and the seat member to the supporting member.

6. A grounding fitting comprising a supporting member, a yoke having threaded legs extending through the supporting member to clamp a grounded conductor thereto, a nut upon each leg of the yoke, bolting means carried by the supporting member and positioned between the legs of the yoke, an anchorage member having means to secure a protective covering for a wiring system to the member, at least one pair of radially spaced holes in the anchorage member through which the bolting means and a leg of the yoke passes to secure the anchorage member to the supporting member, and means to secure a ground wire to the fitting.

In testimony whereof I affix my signature.

STEPHEN N. BUCHANAN.